United States Patent
Pei

(10) Patent No.: US 8,568,282 B2
(45) Date of Patent: Oct. 29, 2013

(54) CIRCULAR GLASS ARTICLE FORMING APPARATUS

(75) Inventor: Shao-Kai Pei, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 355 days.

(21) Appl. No.: 13/160,517

(22) Filed: Jun. 15, 2011

(65) Prior Publication Data

US 2012/0275872 A1 Nov. 1, 2012

(30) Foreign Application Priority Data

Apr. 28, 2011 (TW) .................................. 100114989

(51) Int. Cl.
*B23Q 3/157* (2006.01)
(52) U.S. Cl.
CPC ...................................... *B23Q 3/157* (2013.01)
USPC .............................................. 483/54; 408/88
(58) Field of Classification Search
USPC .......... 408/87, 88, 234, 236, 237; 483/54, 55, 483/56
IPC .......................... B28D 1/14; C03B 33/10,33/02
See application file for complete search history.

(56) References Cited

U.S. PATENT DOCUMENTS

| 3,494,348 | A | * | 2/1970 | Lindblad | 125/20 |
| 4,053,251 | A | * | 10/1977 | Shichida et al. | 408/35 |
| 4,382,728 | A | * | 5/1983 | Anderson et al. | 409/137 |
| 4,993,895 | A | * | 2/1991 | Nordstrom | 408/103 |
| 7,272,882 | B1 | * | 9/2007 | Onsrud | 29/564 |

FOREIGN PATENT DOCUMENTS

EP 0970924 A2 * 1/2000

* cited by examiner

*Primary Examiner* — Andrea Wellington
*Assistant Examiner* — Alan Snyder
(74) *Attorney, Agent, or Firm* — Altis & Wispro Law Group, Inc.

(57) ABSTRACT

A circular glass article forming apparatus includes a supporting board, a slidable block and a circular glass article forming device. The supporting board has recesses for receiving glass plates to be treated, and two parallel first rails located at opposite sides of the recesses. The slidable block is slidable along the first rails. The slidable block has a second rail with a lengthwise direction substantially perpendicular to that of the first rails. The circular glass article forming device includes a supporting body slidable on the second rail, a first rotation motor and a second rotation motor both arranged on the supporting body, and a drill bit mounting device connected to the first rotation motor and having drill bits. The drill bit mounting device is capable of mounting a selected one of the drill bit to be connected to the second rotation motor.

7 Claims, 6 Drawing Sheets

CIRCULAR GLASS ARTICLE FORMING APPARATUS

BACKGROUND

1. Technical Field

The present disclosure relates to a circular glass article forming apparatus.

2. Description of Related Art

In forming circular glass articles, several glass plates are usually aligned and adhered together by UV glue, then the adhered glass plates are clamped at the center by two opposite rods to be ready for forming the circular glass articles using a roll. However, with this method, it is difficult to remove the glue after the circular glass articles are formed, and it consumes time and human sources.

What is needed, therefore, is a circular glass article forming apparatus, which can overcome the above shortcomings.

BRIEF DESCRIPTION OF THE DRAWINGS

Many aspects of the present apparatus can be better understood with reference to the following drawings. The components in the drawings are not necessarily drawn to scale, the emphasis instead being placed upon clearly illustrating the principles of the present apparatus. Moreover, in the drawings, like reference numerals designate corresponding parts throughout the several views.

DETAILED DESCRIPTION

Embodiments of the present apparatus will now be described in detail below and with reference to the drawings.

Figure 1:
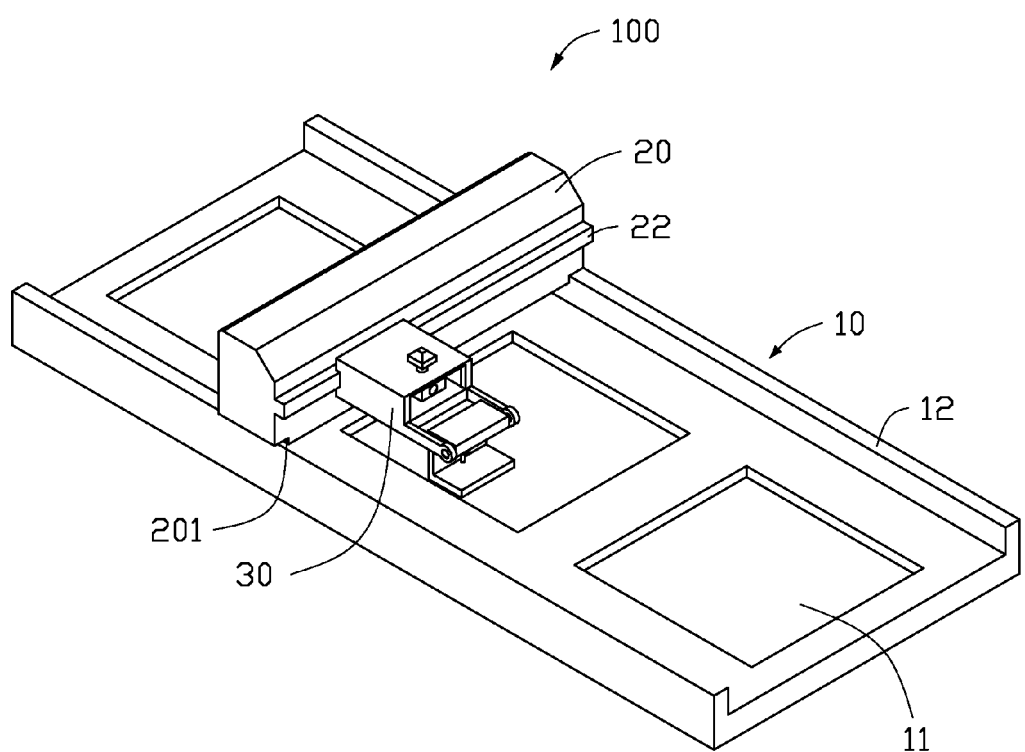
FIG. 1 is a schematic, isometric view of a circular glass article forming apparatus in accordance with one embodiment, the circular glass article forming apparatus including a circular glass article forming device.
Figure 2:
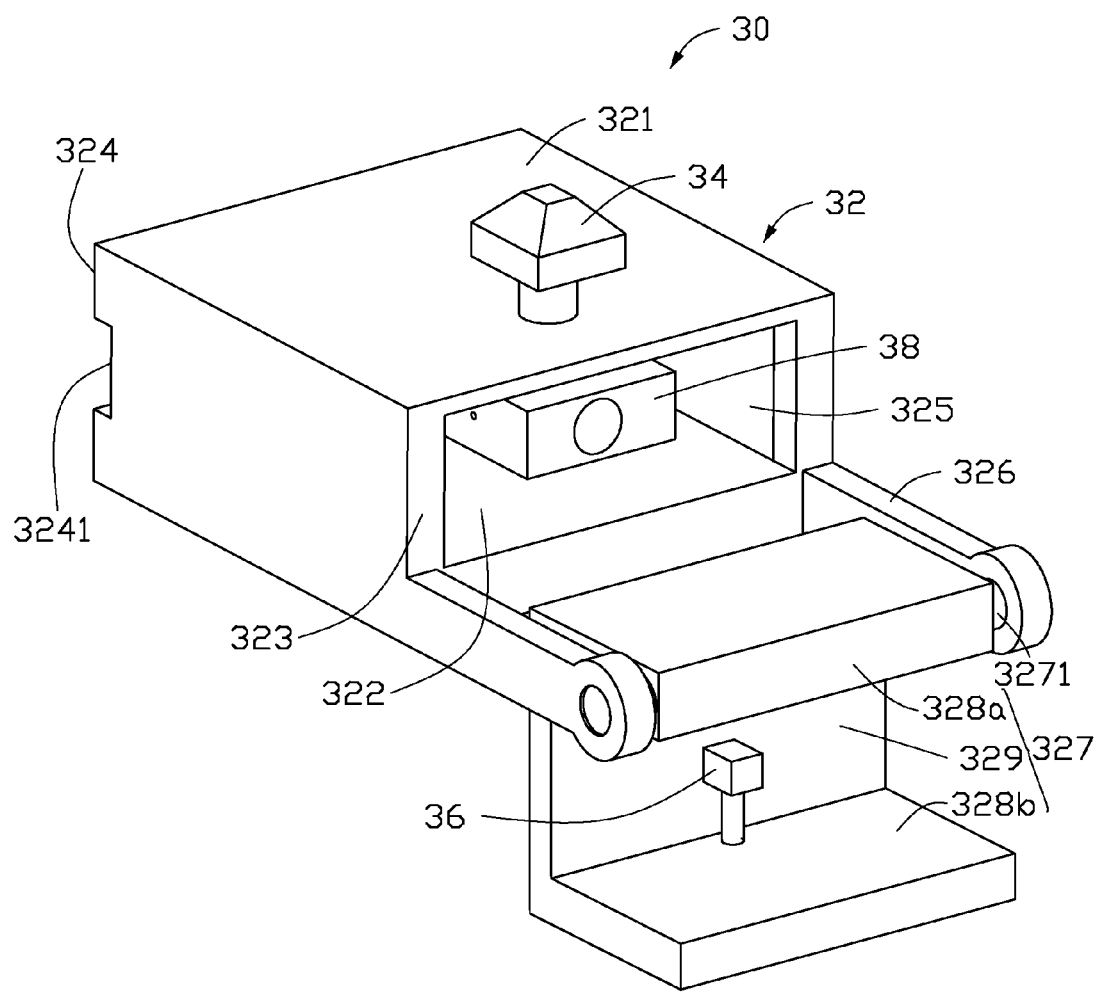
FIG. 2 is an enlarged view of the circular glass article forming device shown in FIG. 1.

Referring to FIGS. 1 and 2, a circular glass plate forming apparatus 100 mainly includes a supporting board 10, a slidable block 20 and a circular glass plate forming device 30.

The supporting board 10 includes a plurality of recesses 11 formed therein, and two first rails 12 arranged at opposite sides of the recesses 11. In the present embodiment, the first rails 12 are parallel with each other, and the recesses 11 are arranged in a line. Sizes of the recesses 11 can be the same or a little different. Each of the recesses 11 is used for receiving a glass plate 200 (see FIG. 6) to be treated. The glass plate 200 is substantially square shaped. Alternatively, the glass plate 200 can be some other shapes the recesses 11 adjusted accordingly.

The slidable block 20 is arranged on the first rails 12 and can be slidable along the lengthwise direction of the first rails 12. Two opposite ends of the slidable block 20, which are adjacent to the respective first rails 12, each have an L-shaped cutout 201. The L-shaped cutouts 201 abut on the respective first rails 12. The slidable block 20 has a second rail 22 formed thereon, and the second rail 22 is substantially perpendicular to the first rails 12.

The circular glass article forming device 30 includes a supporting body 32, a first rotation motor 34, a second rotation motor 36, and a drill bit mounting device 38.

The supporting body 32 includes a chamber 325, two arms 326 extending from the chamber 325, and a drill bit carrying frame 327 pivotably mounted on the two arms 326. The chamber 325 has a top panel 321, a bottom panel 322, two side panels 323, and a rear panel 324. The chamber 325 has an opening formed opposite to the rear panel 324. The rear panel 324 has a groove 3241 formed therein, and the groove 3241 engages with the second rail 22 so that the rear panel 324 is slidable along the second rail 22.

The arms 326 extend horizontally from the bottom panel 322. The drill bit carrying frame 327 includes two horizontal boards 328a, 328b and a vertical board 329 perpendicularly interconnecting the horizontal boards 328a, 328b. The horizontal board 328a is pivotably mounted on the two arms 326 via a pivotal structure 3271 including a shaft and two holes formed in the respective arms 326. The horizontal board 328b carries a drill bit 101 capable of forming a circular glass article from a glass plate. The drill bit 101 is mounted in an inserting hole 3281 formed in a surface of the horizontal board 328b away from the horizontal board 328a.

Figure 3:
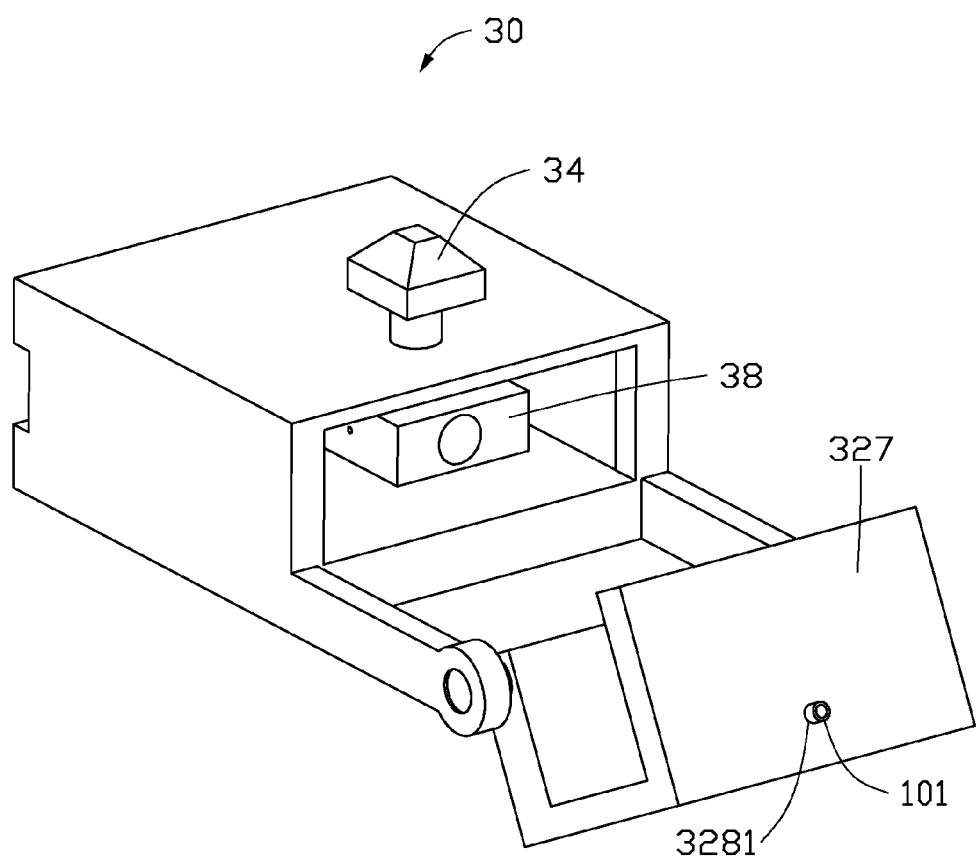
FIG. 3 is similar to FIG. 2, but shows a rotation of a drill bit carrying frame of the circular glass article forming device.
Figure 4:
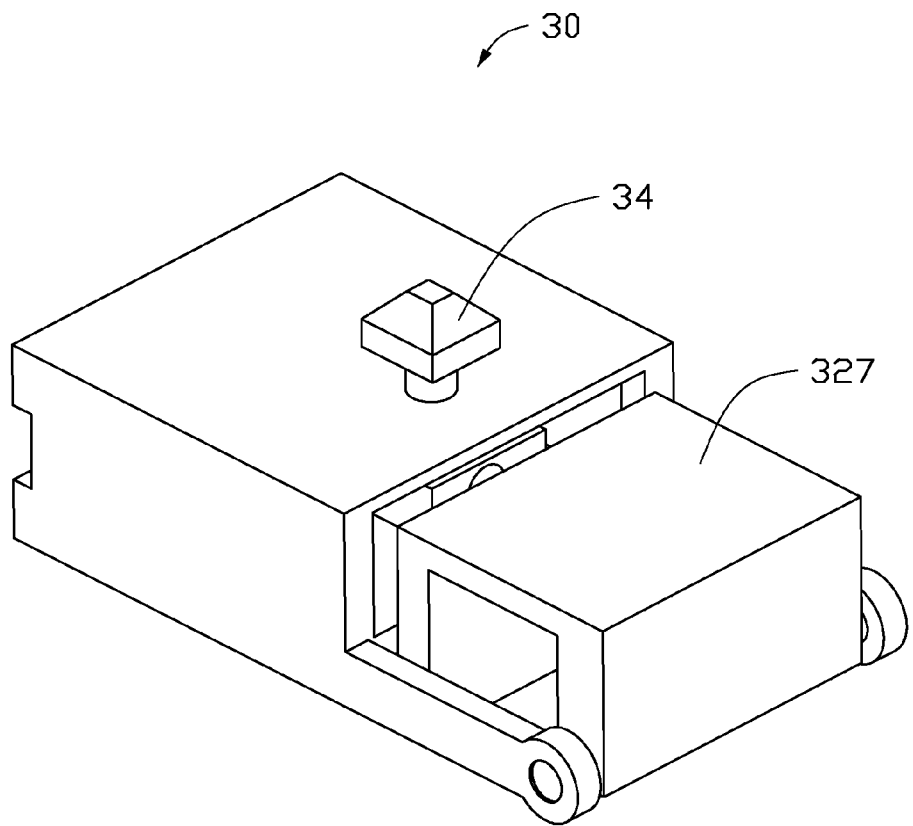
FIG. 4 shows the drill bit carrying frame of FIG. 3 rotated to a drill bit mounting state.

Referring also to FIGS. 3 and 4, the drill bit mounting device 38 is arranged in the chamber 325. The first rotation motor 34 extends through the top panel 321 to connect with the drill bit mounting device 38. The second rotation motor 36 extends into the horizontal board 328b from a surface of the horizontal board 328b, which faces the horizontal board 328a.

The drill bit mounting device 38 can accommodate a plurality of drill bits. Through the pivotal structure 3271, the drill bit carrying frame 327 can rotate to a drill bit replace state (FIG. 4), and through the opening of the chamber 325, a selected drill bit can be mounted into the inserting hole 3281 of the horizontal board 328b, and the selected drill bit then connects to the second rotation motor 36.

Figure 5:
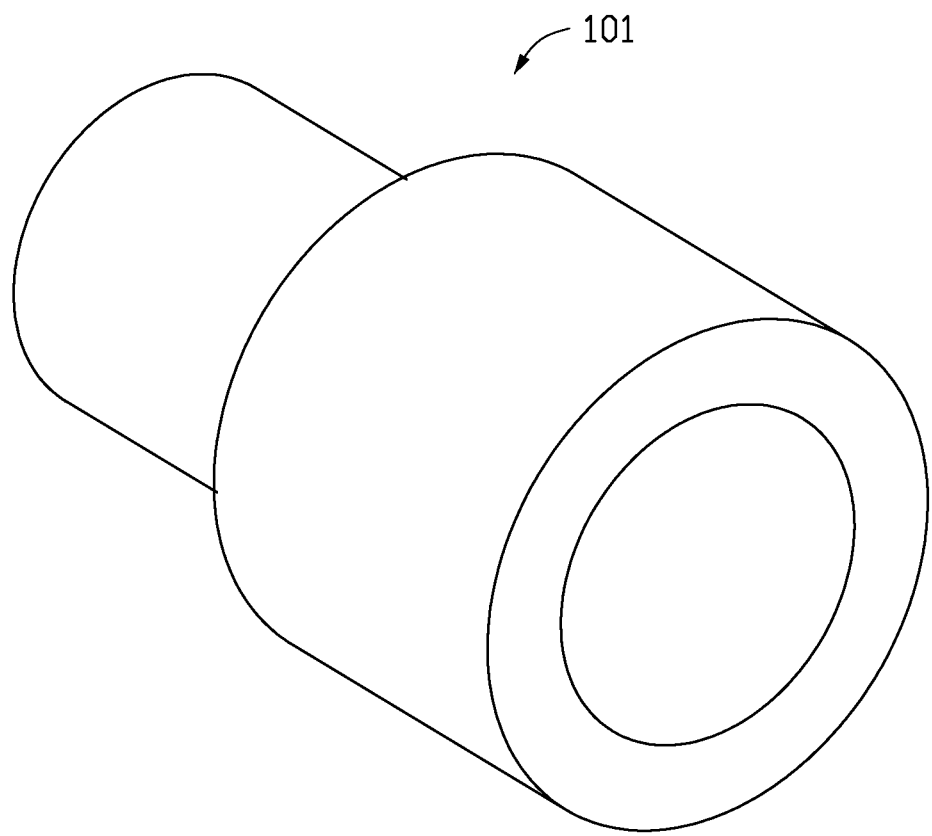
FIG. 5 a schematic, isometric view of a drill bit.

Referring to FIG. 5, the drill bit 101 is a holesaw. The drill bit 101 has a bigger end and a smaller end. In the present embodiment, the smaller end is used to connect to the second rotation motor 36, and the bigger end is used to form the circular glass article. An inner diameter of the bigger end can be determined according to an outer diameter of the circular glass article.

The device 30 is movable in an X-Y plane along the first rails 12 and the second rail 22, so the glass plates do not have to be continually moved to align with the drill bit 101. The drill bit mounting device 38 allows drill bits to be easily replaced, improving efficiency in forming circular glass articles.

Figure 6:
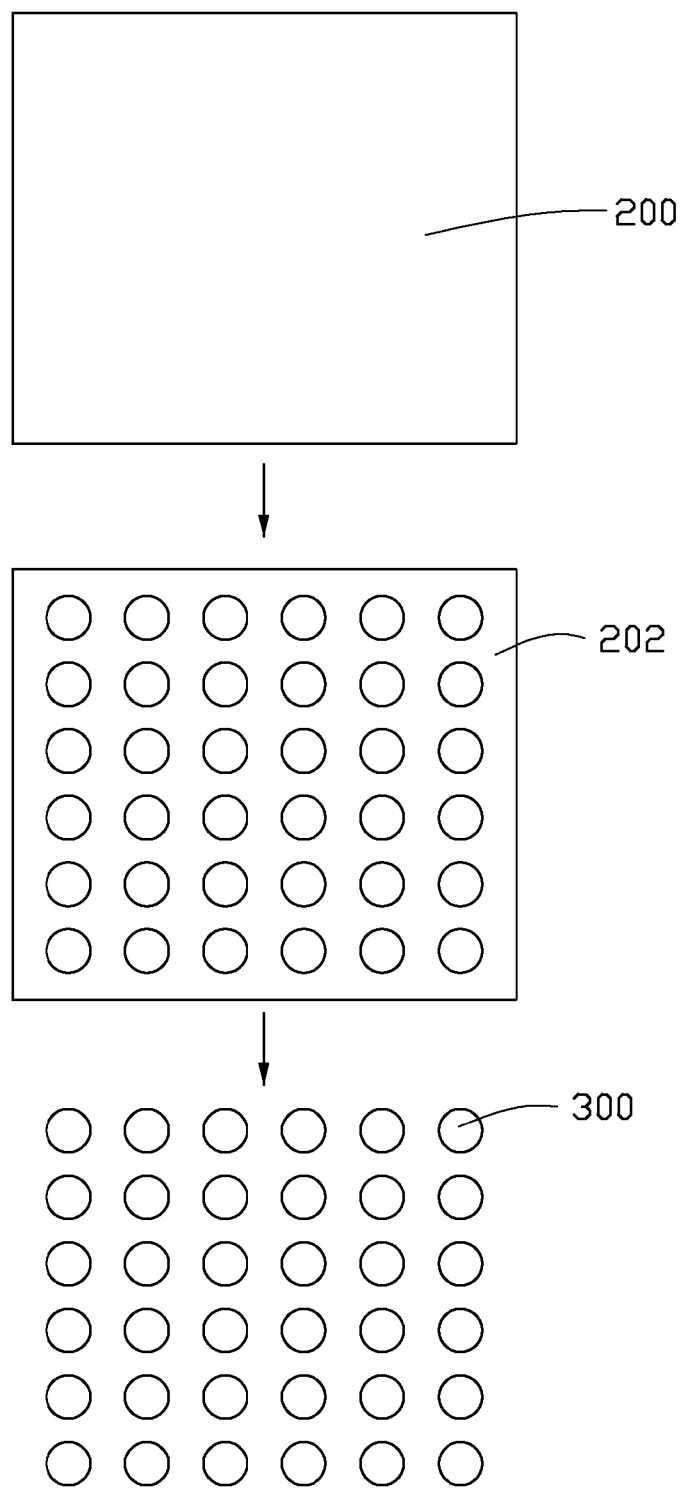
FIG. 6 shows a glass plate to be treated, a glass plate taken off circular glass articles, and a plurality of circular glass articles formed from the glass plate.

FIG. 6 shows a glass plate 200 to be treated, a glass plate 202 with the circular glass articles 300 drilled using the holesaw, and a plurality of circular glass articles 300 formed from the glass plate 202.

It is understood that the above-described embodiments are intended to illustrate rather than limit the disclosure. Variations may be made to the embodiments and methods without departing from the spirit of the disclosure. Accordingly, it is appropriate that the appended claims be construed broadly and in a manner consistent with the scope of the disclosure.

What is claimed is:

1. A circular glass article forming apparatus, comprising:
a supporting board having a plurality of recesses for receiving a plurality of glass plates, and two parallel first rails respectively located at opposite sides of the recesses;
a slidable block arranged on the first rails and being slidable along the first rails, the slidable block having a second rail formed thereon, a lengthwise direction of the second rail being substantially perpendicular to that of the first rails; and
a circular glass article forming device comprising a supporting body, a first rotation motor, a second rotation motor and a drill bit mounting device, the supporting body comprising a chamber, two arms extending from the chamber and a drill bit carrying frame pivotably mounted on the arms, the drill bit mounting device being located in the chamber, the first rotation motor extending through the chamber and connected with the drill bit mounting device, the second rotation motor extending through the drill bit carrying frame and connected with the drill bit, the drill bit mounting device connected to the first rotation motor and having a plurality of drills, the drill bit mounting device configured for selectively mounting one of the drill bits to the second rotation motor.

2. The apparatus of claim 1, wherein the recesses are arranged along the lengthwise direction of the first rails.

3. The apparatus of claim 1, wherein the slidable block comprises two cutouts at opposite ends thereof, the cutouts engaged with the respective first rails.

4. The apparatus of claim 1, wherein the chamber has a rear sidewall having a groove formed therein, and the groove slidably coupled to the second rail.

5. The apparatus of claim 1, wherein the drill bits are hole saws.

6. The apparatus of claim 4, wherein the chamber has an opening, the drill bit carrying frame being rotatable relative to the arms to a position where the drill bit mounting device is capable of mounting the selected drill bit onto the second rotation motor at the drill bit carrying frame.

7. The apparatus of claim 6, wherein the drill bit carrying frame comprises a first horizontal board, a second horizontal board and a vertical board perpendicularly interconnecting the first and second horizontal boards, the first horizontal board pivotably mounted on the arms, the second horizontal board configured for carrying the selected drill.

* * * * *